(Model.) 2 Sheets—Sheet 1.
C. A. GEIGER.
SEEDING MACHINE, CULTIVATOR, AND HARROW.
No. 270,414. Patented Jan. 9, 1883.
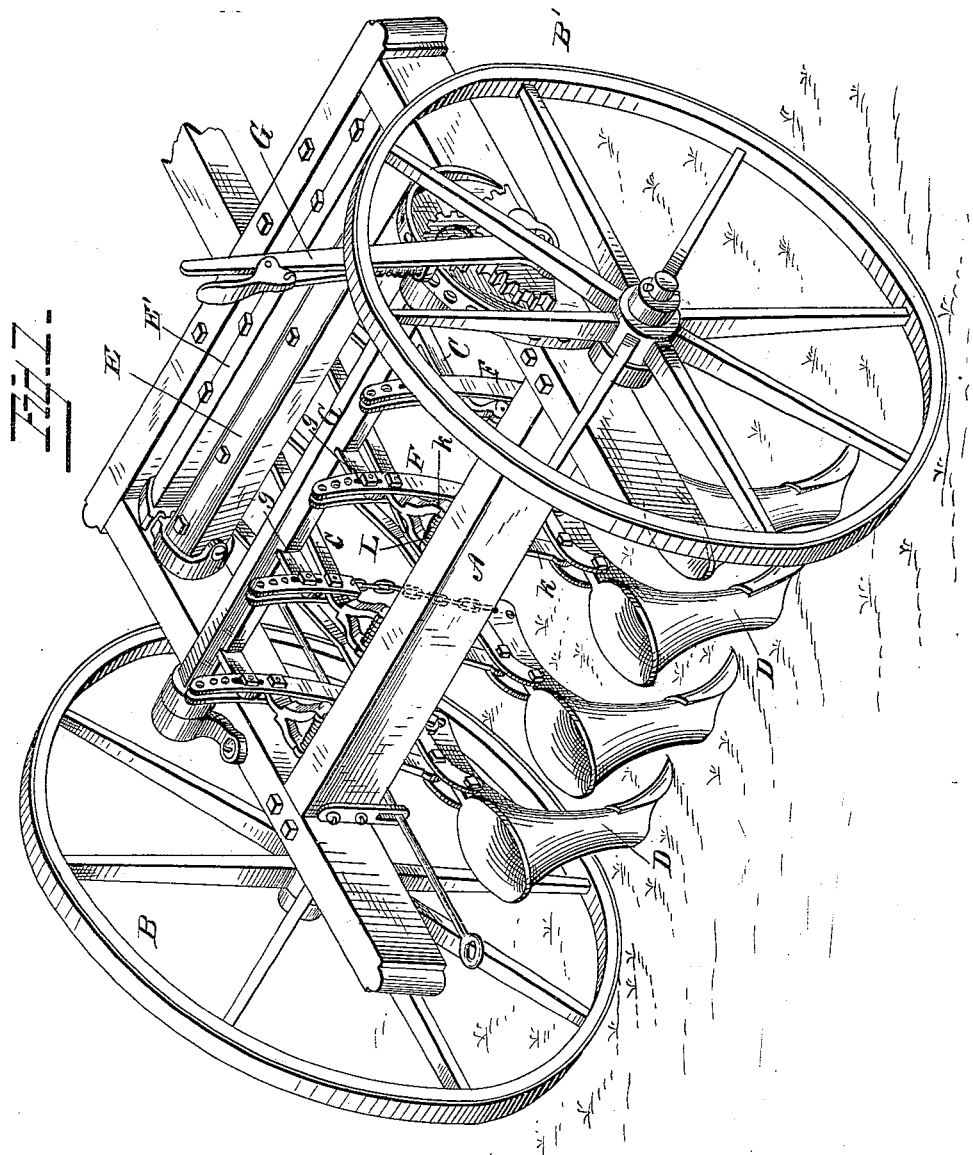
WITNESSES
Franck L. Durand
Rex. Smith
INVENTOR
Chas. A. Geiger,
by All Smith
Attorney.

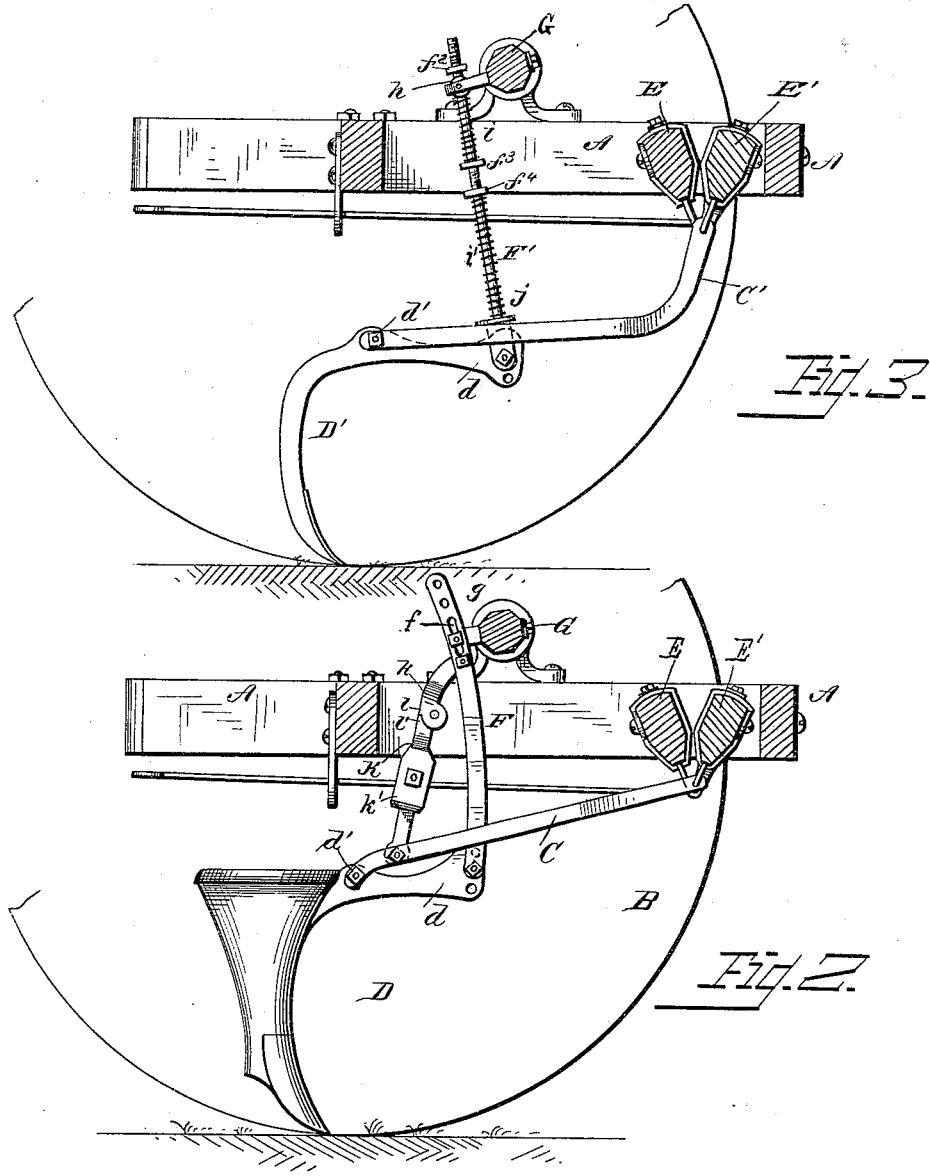

UNITED STATES PATENT OFFICE.

CHARLES A. GEIGER, OF SPRINGFIELD, OHIO.

SEEDING-MACHINE, CULTIVATOR, AND HARROW.

SPECIFICATION forming part of Letters Patent No. 270,414, dated January 9, 1883.

Application filed September 23, 1882. (Model.)

*To all whom it may concern:*

Be it known that I, CHAS. A. GEIGER, of Springfield, county of Clarke, and State of Ohio, have invented new and useful Improvements in Seeding-Machines, Cultivators, and Harrows, of which the following is a full, clear, and exact description, reference being had to the accompanying drawings, making part of this specification.

My invention relates to a novel arrangement, in connection with the draw-bar and lifting-roller of a seeding-machine or cultivator, of pivoted hoe or tooth, and of the means for connecting said draw-bar and hoe or tooth with the lifting-roller, whereby the spring which holds the draw-bar down to its work is adapted to hold the hoe or tooth in working relation to said draw-bar; to the combination, with the rod, link, or chain which connects the draw-bar or the pivoted hoe or tooth with the lifting-roller, of a jointed self-locking pressure-bar for holding the hoe or tooth down to its work, and to certain details of construction and arrangement hereinafter described.

In the accompanying drawings, Figure 1 is a perspective view of so much of a grain-drill or seeding-machine as is necessary to show my improvements. Fig. 2 represents a vertical longitudinal section through the same; and Fig. 3 is a view similar to Fig. 2, showing a modification in the form of the hoe or tooth and in the means for connecting the same with the lifting-roller.

A represents the frame of the machine, which may be similar in construction to such as are now in use in seeding-machines or cultivators; and B B', the main carrying and driving wheels, applied thereto in any usual or preferred manner.

C C' are the draw-bars, to which the hoes or teeth are pivoted, said draw-bars being connected at their forward ends with transverse pivoted beams or rock-shafts E E' for shifting the hoes or teeth from a single line or row to a zigzag position or double row, and vice versa, in any usual manner.

The hoes or teeth D or D' may be made in any usual or preferred form, according to the use to which they are to be applied, whether for a grain-drill, a broadcast seeding-machine, or a cultivator, and are pivoted at or near their upper ends to the rear ends of the draw-bars, which by preference are made double, or of bars parallel at their rear ends and divergent at their forward ends for giving them a broad hinge or pivotal connection with the rocking bars E and E'.

The preferred form or construction of tooth or hoe is to provide it at its upper end with a forwardly-projecting arm, d, extending in advance of the pivotal connection (indicated at d') of the hoe or tooth with the draw-bar, and from the forward end of this arm d a link, F, or a chain or rod, F', extends upward, connecting said arm with a short crank-arm, g, on a transverse lifting roller or shaft, G.

The shaft or roller G is pivoted in suitable bearings in the side longitudinal frame-bars, and has a lever, G', either secured to it directly or geared to it, as shown, by a segment-rack and pinion for rocking it in said bearings, said lever being provided with a thumb-latch, operating, in connection with a toothed or perforated arch or segment, on the frame for holding the lever G' at any desired adjustment.

Where the link F is employed—that being the preferred device—in connection with a grain-drill hoe or tooth, a slotted connection (indicated at f) is made between the link and the arm g for permitting a slight independent movement of the teeth to accommodate themselves to the surface of the ground over which they are drawn, and the slot permitting this movement may be formed either in the link or in the arm g, as preferred, the connecting-pin sliding in said slot being attached to the other part. Where a rod is employed, as indicated at F', Fig. 3, it may be connected with the arm g of the lifting-roller in any suitable manner; but for the purpose of allowing the independent rising and falling movement of the teeth referred to it is preferred to pass its upper end through an eye or perforation in a block, h, swiveled in the forked end of the arm g. A pin or collar, $f^2$, on the upper end of the rod prevents the rod and tooth from dropping too low, and a spring, i, interposed between the arm g and a collar on the rod below said arm, serves to hold the rod down and to limit its upward movement. This spring may extend the whole length of the rod between the arm *g* and a loose washer or collar, *j*, sliding on the rod F and resting on the draw-bar C, as shown; or two short springs, *i* and *i'*, may be employed, one extending from the arm *g* to a fixed collar, *f³*, and the other from a fixed pin or collar, *f⁴*, to the sliding collar or washer *j*. By this arrangement of spring interposed between the arm *g* of the lifting-roller and the draw-bar the latter is held down to its work, and at the same time the forwardly-projecting arm *d* of the hoe is drawn upward by the tension of the spring on the rod F', thereby holding the hoe or tooth in proper working relation to the draw-bar.

K is a jointed pressure rod or bar, composed of two parts, *k* and *k'*, the one, *k*, pivoted to the arm *g* of the lifting-roller, or by preference, where the slotted link F is employed, to the latter just below the arm *g*, as shown in Fig. 2, and the other, *k'*, to the draw-bar C in advance of the pivotal connection of the latter with the hoe or tooth, the adjoining ends of the two parts being bifurcated and provided with locking spurs or shoulders *l l'* and a distending spring, L, the construction of said parts being by preference similar to the corresponding parts of the jointed pressure rod or bar described in Letters Patent No. 261,643, granted to J. W. Thomas, July 25, 1882, or in other equivalent form for the purposes therein described—viz., of forming a jointed pressure rod or bar provided with a self-locking joint.

By the construction and arrangement of the lifting-roller and the connecting rod, link, or chain, and jointed pressure-rod connecting the draw-bar and the pivoted hoe or tooth with said lifting-roller, it will be seen that the hoe or tooth is held in proper working relation to the draw bar, and both the draw-bar and tooth are held firmly down to their work, and at the same time each tooth is adapted to rise and fall within certain limits independently of the other hoes or teeth of the machine, and also to yield to obstructions, which would be liable to injure or break it. The means for adjusting the lifting-roller may be similar to those described in Letters Patent No. 258,824, granted May 30, 1882, to Thomas and Ludlow, and the jointed pressure-rods may, if desired, be constructed and arranged as therein described, or in any other suitable manner attaining the results therein described. The arrangement of the pressure-rod and of the rod, link, or chain interposed between the lifting-roller and the draw-bar and tooth relatively to said draw-bar and tooth may be varied, so long as they serve to hold the tooth in proper working relation to the draw-bar and the latter with the tooth down to its work.

Parts of the machine not particularly described may be constructed and arranged in any usual or preferred manner.

Having now described my invention, I claim as new—

1. In a seeding-machine or cultivator, a hoe or tooth pivoted to its draw-bar, and provided with a forwardly-projecting arm connected by a rod, link, or chain with the lifting-roller.

2. In a seeding-machine or cultivator, a hoe or tooth pivoted to its draw-bar, and provided with a forwardly-projecting arm connected by a rod, link, or chain with the lifting-roller, in combination with a spring the tension of which is exerted to hold said hoe or tooth in working position.

3. In a seeding-machine or cultivator, a hoe or tooth pivoted to its draw-bar and connected by a rod, link, or chain with the lifting-roller, in combination with a jointed pressure-rod for holding said hoe or tooth down to its work.

4. A hoe or tooth pivoted to a draw-bar and connected by a rod, link, or chain with the lifting-roller, in combination with a jointed pressure-rod connecting the draw-bar with the lifting-roller, said pressure-rod being provided with a locking-joint and a spring which exerts its tension to hold said joint locked.

5. In a seeding-machine or cultivator, a spring arranged to exert its tension to hold the draw-bar down to its work, and at the same time to hold the hoe or tooth in working relation to said draw-bar.

6. In a seeding-machine or cultivator, the combination of a draw-bar, a hoe or tooth pivoted to said draw-bar, a lifting-roller, a lever for controlling said roller, a jointed pressure-bar, and a rod, link, or chain interposed between the lifting-roller and the draw-bar and hoe, and a spring arranged to exert its tension to hold the draw-bar down to its work, and at the same time to hold the hoe or tooth in working relation to said draw-bar.

In testimony whereof I have hereunto set my hand this 15th day of September, A. D. 1882.

CHAS. A. GEIGER.

Witnesses:
H. B. ZEVELY,
R. M. SMITH.